May 21, 1935.  G. K. McCANN  2,001,933
BRAKE
Filed Sept. 17, 1930  5 Sheets-Sheet 1

INVENTOR.
GEORGE K. McCANN
BY
M. W. McConkey
ATTORNEY

May 21, 1935. G. K. McCANN 2,001,933
BRAKE
Filed Sept. 17, 1930 5 Sheets-Sheet 2

INVENTOR.
GEORGE K. McCANN
BY
M. W. McConkey
ATTORNEY

May 21, 1935.　　　　　G. K. McCANN　　　　　2,001,933
BRAKE
Filed Sept. 17, 1930　　5 Sheets-Sheet 3
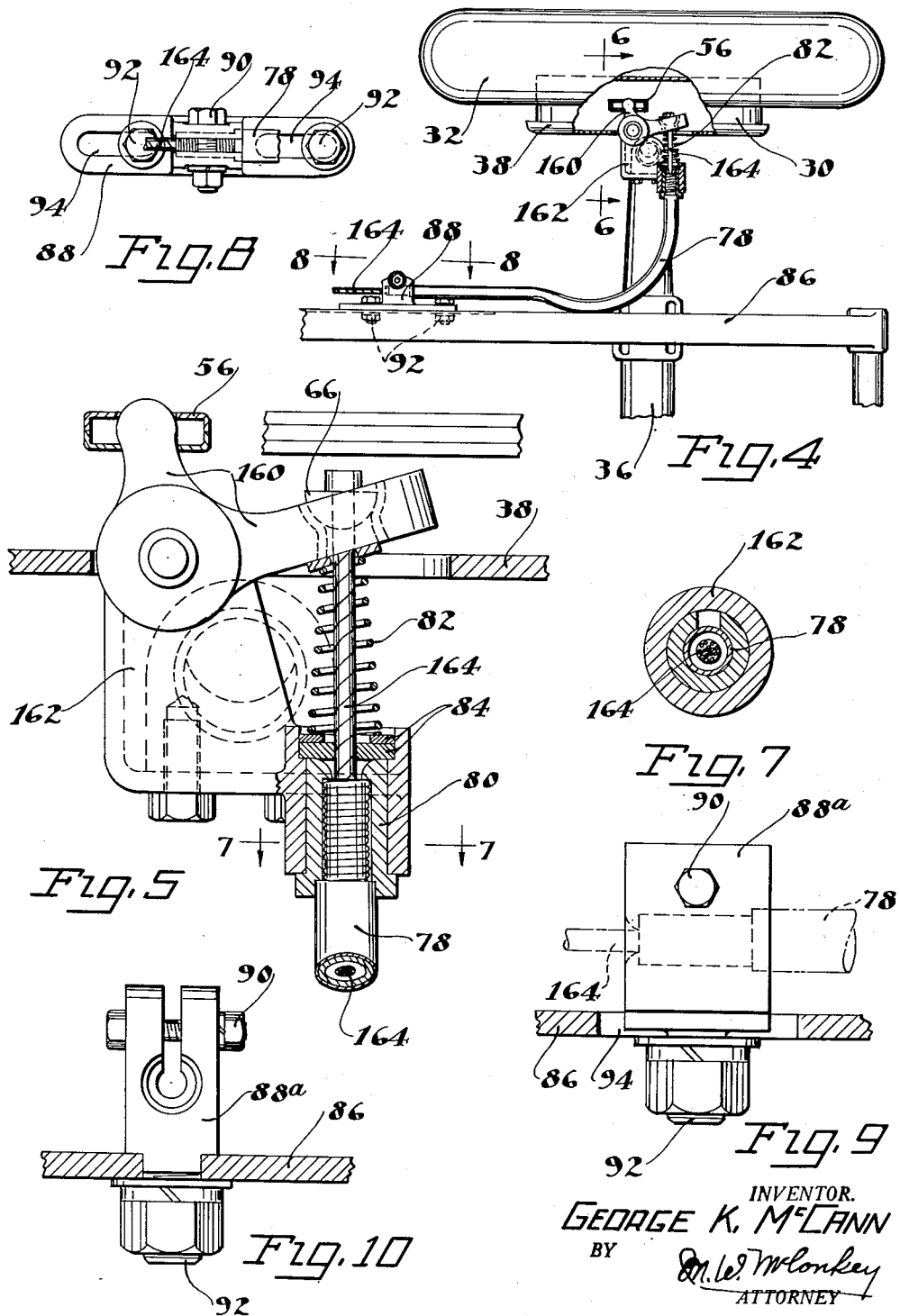
INVENTOR.
GEORGE K. McCANN
BY
ATTORNEY May 21, 1935. G. K. McCANN 2,001,933
BRAKE
Filed Sept. 17, 1930 5 Sheets-Sheet 4

INVENTOR.
GEORGE K. McCANN
BY
M. W. McConkey
ATTORNEY

May 21, 1935.  G. K. McCANN  2,001,933
BRAKE
Filed Sept. 17, 1930   5 Sheets-Sheet 5

INVENTOR.
GEORGE K. McCANN
BY
  M. W. McConkey
    ATTORNEY

Patented May 21, 1935

2,001,933

UNITED STATES PATENT OFFICE 2,001,933

BRAKE

George K. McCann, South Bend, Ind., assignor to Bendix Brake Company, South Bend, Ind., a corporation of Illinois Application September 17, 1930, Serial No. 482,430

12 Claims. (Cl. 188—78)

This invention relates to brakes, and is illustrated as embodied in novel operating mechanism for automobile brakes, preferably adaptable for use with front wheel brakes. An object of the invention is to simplify the operating mechanism by utilizing an operating lever swinging crosswise of the backing plate and preferably carrying at its end a novel floating cam lever; by arranging the parts to be operated by a cable or equivalent tension element engaging a guide on the axle or passing through a flexible Bowden-type conduit, and in some cases forming a joint with the cable which is arranged substantially in the swiveling axis of the wheel when the brake is applied; and by improved arrangements of the bracket for the lever and by other novel and desirable arrangements which will be apparent from the following description of the illustrative embodiments shown in the accompanying drawings, in which:

Figure 4 is a plan view, partly broken away in horizontal section, of one front wheel and associated parts, with a modified form of operating mechanism including a Bowden conduit for the cable;

Figure 5 is a horizontal section on a larger scale than Figure 4, and showing the mounting of the operating lever;

Figure 7 is a section on the line 7—7 of Figure 5, showing the attachment of the end of the Bowden conduit;

Figure 8 is a partial view, looking in the direction of the arrows 8—8, of the attachment of the rear end of the conduit to the chassis frame;

Figure 9 is a top plan view of an alternative form of rear conduit attachment;

Figure 10 is a view of the fitting of Figure 9, looking from the right in Figure 9;

Figure 13:
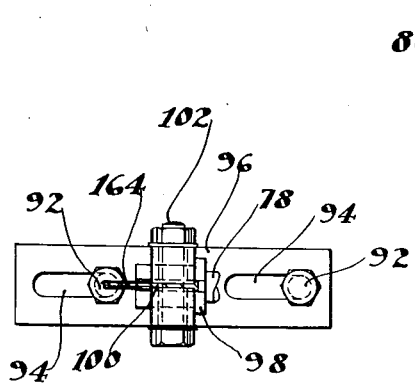
Figures 13 and 14 are respectively an elevation and a plan of another form of fitting for the frame end of a Bowden control.
Figure 14:
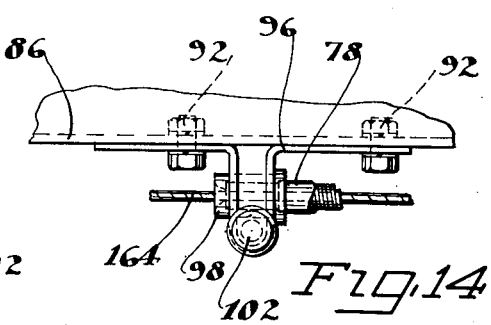
Figure 17:
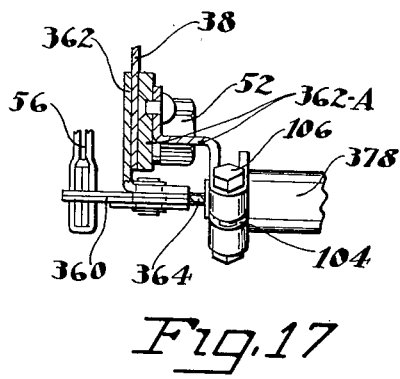
Figure 18:
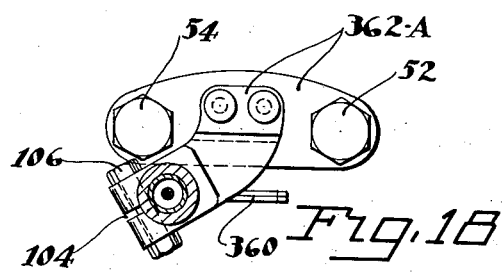
Figure 19:
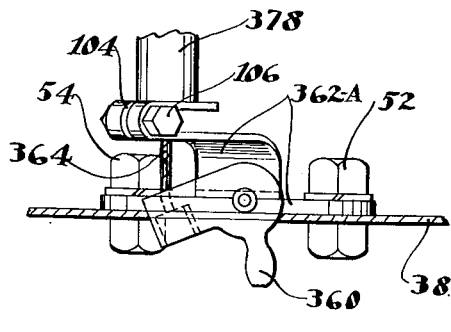
Figures 20, 21:
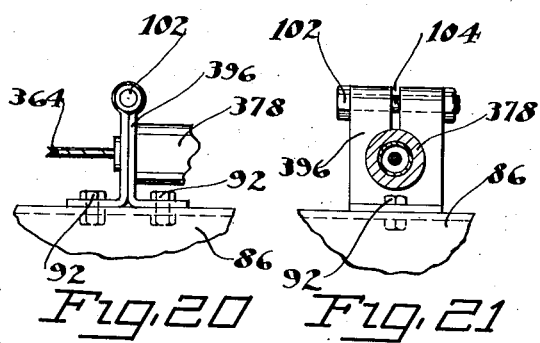
Figure 22:
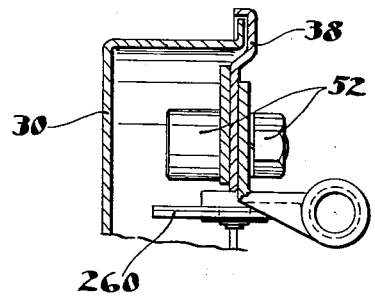
Figure 23:
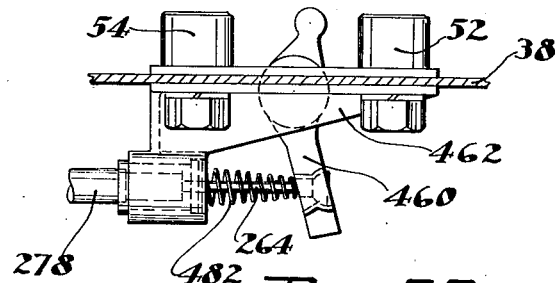
Figure 24:
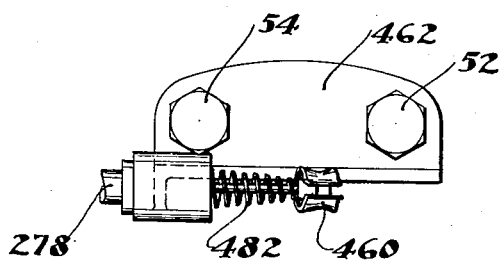
Figure 26:
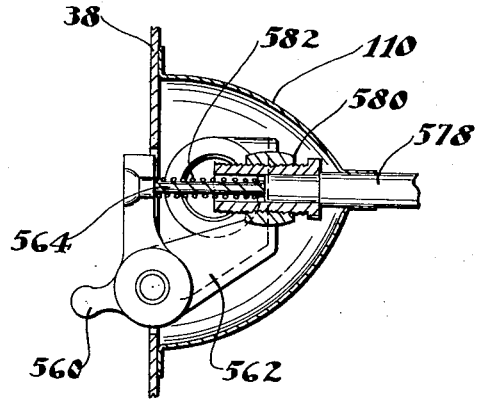
Figure 25:
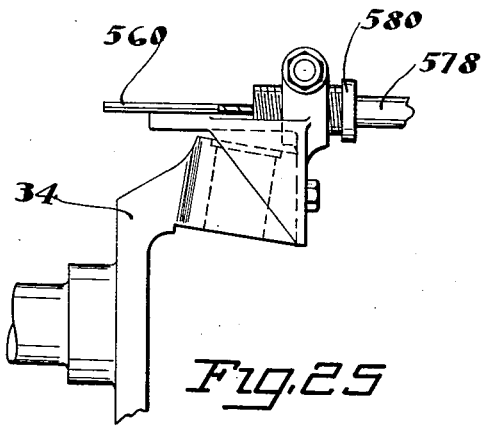
Figure 27:
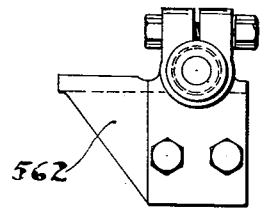

Figures 17, 18, and 19 are respectively a vertical section, an elevation looking outwardly, and a top plan view, showing another simple species of the arrangement with the brake anchors holding the bracket;

Figures 20 and 21 are respectively plan and elevational views of another frame support generally like that of Figures 13 and 14;

Figures 22, 23, and 24 are vertical and horizontal sections and an elevation looking outwardly, of another species in which the anchors hold the bracket, and suitable more particularly for use on a rear wheel; and Figures 25, 26, and 27 are respectively vertical and horizontal sections and an elevation looking outwardly, of a different novel operating means for a front wheel brake.

The brake, with which my novel operating means in its various forms is intended to be used, is illustrated as including a rotatable drum 30, carried by a wheel 32 mounted (in Figures 2, 4, etc.) on a knuckle 34 swiveled at the end of a front axle 36, although some forms are more particularly useful for a brake on a rear wheel which is not specifically shown, as it may be of any desired form. The brake preferably includes a support such as a backing plate 38 secured to and carried by the knuckle or by the rear axle.

For purposes of illustration, the brake is shown of the shiftable-anchorage type, including friction means such as shoes 40 and 42 connected by a pivotal and adjustable connection 44 and having any suitable steady rests 46 and return springs 48, and if desired provided with a roller stop 50 on an adjustable eccentric. The brake in the form illustrated has two anchors bolted to or otherwise carried by the backing plate, one anchor 52 against which the shoe 40 anchors when the drum is turning clockwise, and another anchor 54 against which the shoe 42 anchors when the drum is turning counter-clockwise.

According to one feature of the present invention, the brake is applied by novel means including a floating lever 56 having pivoted thereon thrust blocks 58 engaging the shoe ends, the lever 56 being formed if desired of two channel-section stampings arranged face to face (see Figure 5) and being formed at its lower end with an opening sleeved over the rounded end of an operating bellcrank lever 60 or the like. Lever 60, together with the ends of the shoes, supports the floating lever 56.

Figure 1:
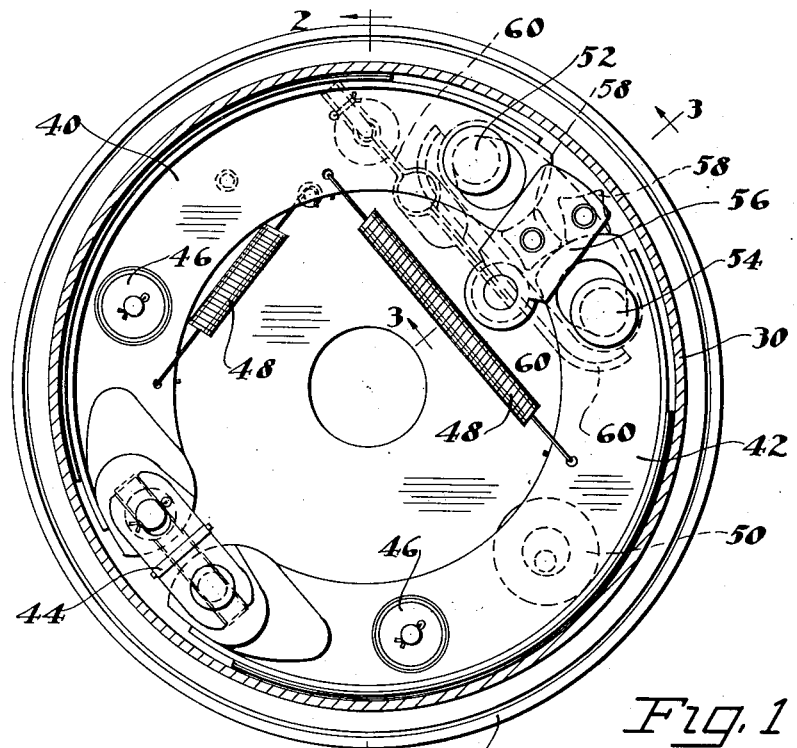
Figure 1 is a vertical section through the brake, just inside the head of the brake drum, and showswiveled knuckle of a front wheel.
Figure 2:
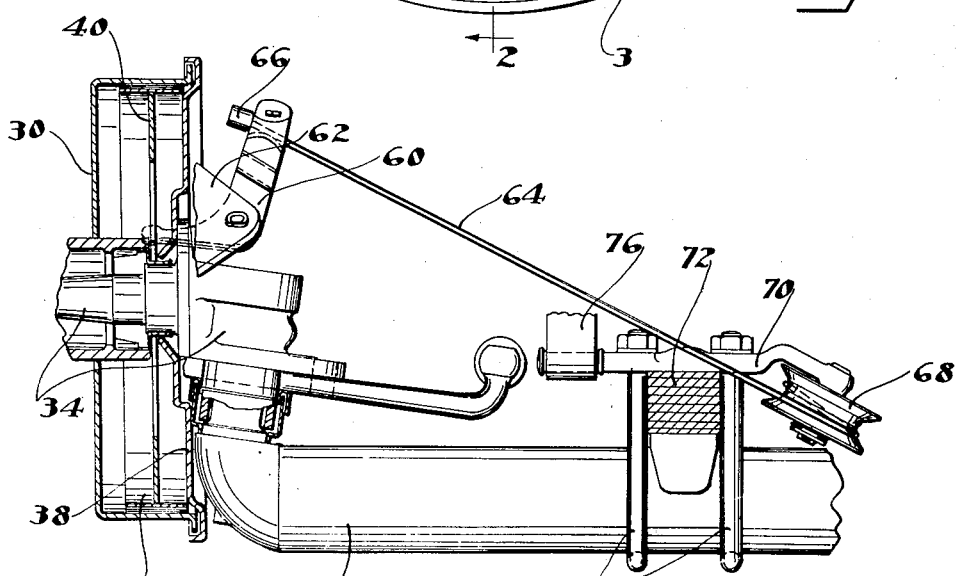
Figure 2 is a vertical section through the brake and associated parts on the line 2—2 of Figure 1, and showing the mounting of the brake on the swiveled knuckle of a front wheel.
Figure 3:
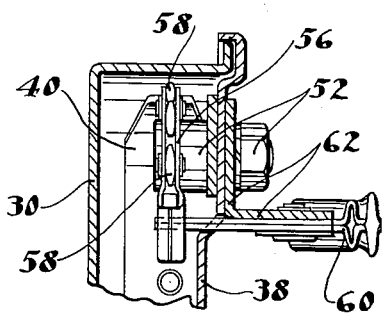
Figure 3 is a partial radial section on the line 3—3 of Figure 1, showing the relative arrangement of the operating lever and the cam lever.
Figure 6:
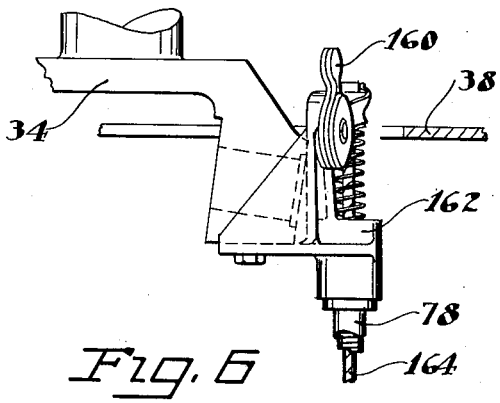
Figure 6 is a view of the parts in Figure 5, but at right angles thereto and on the line 6—6 of Figure 4.
Figure 11:
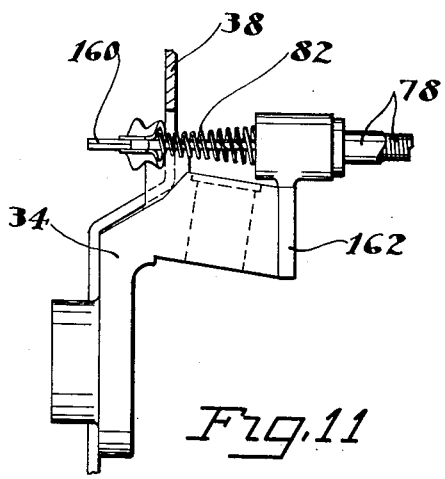
Figure 11 is a vertical sectional view of a modified arrangement in which the bracket is carried by the knuckle instead of by the brake backing plate.
Figure 12:
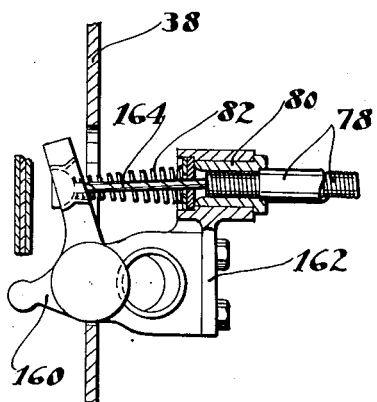
Figure 12 is a horizontal sectional view showing the principal parts of Figure 11 in plan.

The operating lever 60 swings in a plane crosswise of the plane of the backing plate and which is arranged in Figures 1–3 at an angle of about 45 degrees to the vertical. Lever 60 is fulcrumed on a novel support or bracket 62 secured to the backing plate by means of the anchors 52 and 54 (see Figure 3). It will be observed that lever 60 crosses the plane of the backing plate, one end being inside and the other outside of the brake, the backing plate being formed with a suitable opening for the lever.

In the arrangement of Figures 1–3, lever 60 is connected to a tension element such as a cable 64 having a swivel joint 66 therewith which is arranged (when the brake is applied) in or immediately adjacent the swiveling axis of the wheel. Cable 64 passes over a pulley 68, shown on axle 36, and thence extending rearwardly to form a part of any desired brake-operating hook-up. In Figure 2, pulley 68 is shown mounted at one end of a pad 70 for the usual spring 72 and held by U-bolts 74, the pad 70 also being extended at its other side to engage the shock-absorber connection 76.

In Figures 4–10, the lever 56 is supported and operated by a bellcrank operating lever 160 formed of two stampings secured together (see Figure 6) and fulcrumed on a bracket 162 bolted or otherwise secured to the knuckle 34. The lever 162 is operated by a tension element such as a cable 164, which in this case forms part of a Bowden-type control and passing through a flexible Bowden-type conduit 78 having its forward end approaching the brake substantially at right angles to the backing plate and seated in a bushing 80 (Figure 5) carried by a sleeve forming part of the bracket 162. A coil return spring 82 may be sleeved on the cable 164 and confined between lever 160 and washers 84 seated against the end of bushing 80.

The rear end of the control may extend parallel to the chassis frame side member 86, with the rear end of conduit 78 secured thereto by means such as a split clamp 88 clamped about the conduit end by a clamp bolt 90 and adjustably secured to the frame by a bolt portion or portions 92 extending through a slot 94. As shown in Figures 4 and 8, there may be two bolts 92, or as shown in the clamp 88a in Figures 9 and 10 there need be only one, and as shown in Figure 8 the slots 94 may be in the bracket or fitting 88, while as shown in Figures 9 and 10 the slot 94 may be in the chassis frame member.

Figures 13 and 14 show an alternative form of fitting for securing the rear end of conduit 78 to the chassis frame. In this arrangement, bolts 92 pass through slots 94 formed in the alined wing ends of a stamping 96 having a U-shaped central portion having alined openings in its sides receiving a bushing 98 or the like which embraces or is shrunk onto the end of the conduit. A slot 100 is formed in the base of the U, intersecting the openings for the bushing 98, so that a bolt 102 confined in the base of the U by bushing 98 can be tightened up to clamp the bushing in place.

Figure 15:
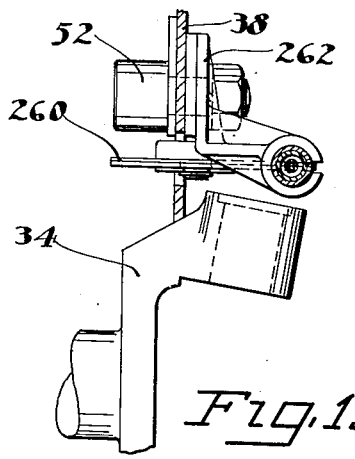
Figures 15 and 16 are respectively vertical and horizontal sectional views showing a novel arrangement in which the lever-supporting bracket is secured to the backing plate by the brake anchors.
Figure 16:
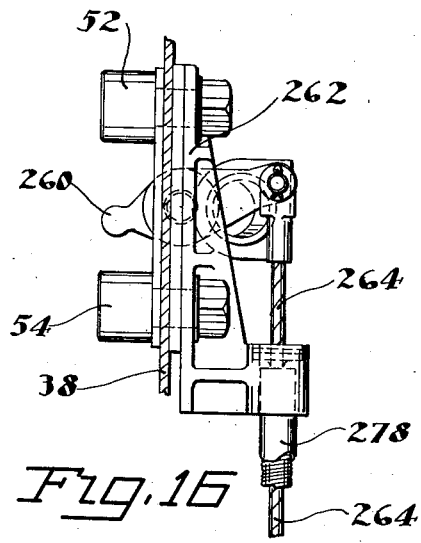

In the arrangement of Figures 15 and 16, operating lever 260 is generally straight, and is fulcrumed on a support such as a bracket 262 secured to the backing plate 38 by means of the anchors 52 and 54. Bracket 262 is formed at its rear end with a seat for the end of conduit 278, through which passes the tension element 264 connected to lever 260. In this arrangement, as illustrated, conduit 278 parallels the backing plate.

In Figures 17–19, the operating lever 360 is fulcrumed on a bracket or stamping 362 engaging the inner face of the backing plate, while the end of conduit 378 (shown perpendicular to the backing plate) is secured to a second bracket 362a (shown as made of two stampings riveted together) engaging the outer face of the backing plate, both brackets being secured to the backing plate by means such as the anchors 52 and 54. Bracket 362a may be formed with a slot 104 and a clamp bolt 106 for contracting and clamping it upon the end of the conduit. The cable 364 here passes through the conduit, as before, and is connected to lever 360.

In Figures 20 and 21, the frame fitting 396 for the rear end of conduit 378 is substantially the same as fitting 96 shown in Figures 13 and 14 except that the sides of the U-shaped central portion are pressed into engagement with each other, leaving a loop for bolt 102.

The arrangement in Figures 22, 23, and 24 is substantially the same as that in Figures 15 and 16, except that it is adapted for use with a rear wheel brake, lever 460 being longer than lever 260, and a return spring 482 being sleeved on the cable end.

In Figures 25–27, bracket 562 is supported by the knuckle 34, and bushing 580 carried thereby is adjustable to take up slack in the cable 582. The parts are here inclosed in a boot 110 of rubber or the like, having a central opening embracing conduit 578 and having its margin adhesively or otherwise secured to the backing plate.

While several illustrative embodiments have been described in detail, it is not my intention to limit the scope of the invention to those particular embodiments, or otherwise than by the terms of the appended claims.

1. A brake comprising a backing plate having an opening therethrough and a bracket adjacent the opening, a lever swinging in a plane crosswise of the plane of the backing platen and passing through the opening and pivoted on the bracket to rotate about an axis substantially parallel to the plane of the backing plate and having portions inside and outside of the backing plate, a floating brake-applying lever inside the backing plate pivotally mounted on and carried by the pivoted lever, and operating connections outside of the backing plate engaging the pivoted lever.

2. A brake comprising a backing plate having an opening and provided with a bracket adjacent the opening, a lever extending through the opening and pivoted on the bracket, a conduit having its end connected to the bracket, and a tension operating element passing through the conduit and connected to the lever.

3. A brake comprising a backing plate having an opening, a pivoted lever extending through the opening and having parts inside and outside the backing plate, a conduit having its end connected to the backing plate, and a tension operating element passing through the conduit and connected to the lever.

4. A brake comprising a backing plate provided with an opening, a lever movable in said opening in a plane generally perpendicular to the plane of the backing plate, a conduit connected to the backing plate, and a cable passing through the conduit and connected to the lever.

5. A brake comprising a backing plate provided with an opening, a lever movable in said opening in a plane generally perpendicular to the plane of the backing plate, a conduit connected to the backing plate, a cable passing through the conduit and connected to the lever, and a floating lever inside the backing plate mounted on the first lever and generally at right angles thereto.

6. A brake comprising a backing plate having mounted thereon an operating lever extending crosswise of the plane of the backing plate, a floating cam lever operatively mounted on and carried by one end of said operating lever, an axle having a cable-engaging element, and a tension cable engaging said element and connected to the other end of the operating lever.

7. An operating lever comprising two stampings engaging each other flatwise and rounded at the ends forming one end of the lever and formed at an intermediate portion to be pivoted on a fulcrum, the other end of the lever having a part in which the stampings are formed with registering grooves forming an opening through the lever.

8. An operating lever comprising two stampings engaging each other flatwise and rounded at the ends forming one end of the lever and formed at an intermediate portion to be pivoted on a fulcrum, the other end of the lever having a part in which the stampings are formed with registering grooves forming an opening through the lever, together with a cam lever having co-operating thrust parts and formed at its end with an opening embracing the rounded end of the operating lever.

9. An operating lever comprising two stampings engaging each other flatwise and rounded at the ends forming one end of the lever and formed at an intermediate portion to be pivoted on a fulcrum, the other end of the lever having a part in which the stampings are formed with registering grooves forming an opening through the lever, a cam lever having co-operating thrust parts and formed at its end with an opening adapted to embrace the rounded end of an operating lever.

10. Brake-operating means comprising a bracket, a conduit connected at its end to the bracket, a lever fulcrumed on the bracket, a tension element passing through the conduit and connected at its end to the lever, and a spring sleeved on the tension element and confined between the lever and bracket and resisting movement of the lever due to tension on said element.

11. Brake-operating means comprising a bracket, a conduit connected at its end to the bracket, a lever fulcrumed on the bracket, a tension element passing through the conduit and connected at its end to the lever, a spring sleeved on the tension element and confined between the lever and bracket and resisting movement of the lever due to tension on said element, and an enclosure carried by the conduit and housing the lever and the spring and the exposed end portion of the tension element.

12. A brake comprising a backing plate having spaced anchors, a bracket held by said anchors, a lever between said anchors, a conduit having one end secured to the bracket, and a tension element extending through the conduit and acting on said lever.

GEORGE K. McCANN.

CERTIFICATE OF CORRECTION.

Patent No. 2,001,933.                                                    May 21, 1935.

GEORGE K. McCANN.

It is hereby certified that error appears in the printed specification of the above numbered patent requiring correction as follows: Page 1, first column, line 22, strike out the words "swiveled knuckle of a front wheel" and insert instead the syllable and words ing the brake shoes in side elevation; and that the said Letters Patent should be read with this correction therein that the same may conform to the record of the case in the Patent Office.

Signed and sealed this 5th day of November, A. D. 1935.

Leslie Frazer (Seal)                                                    Acting Commissioner of Patents.